US011882489B2

(12) United States Patent
Yang et al.

(10) Patent No.: US 11,882,489 B2
(45) Date of Patent: Jan. 23, 2024

(54) SYSTEM AND METHOD FOR GENERATING AND USING A DIFFERENTIATED NEIGHBOR LIST

(71) Applicant: VERIZON PATENT AND LICENSING INC., Basking Ridge, NJ (US)

(72) Inventors: Jin Yang, Orinda, CA (US); Frank Jager, Chester, NJ (US); Parvez Ahmad, Fremont, CA (US); Krishna K Bellamkonda, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 247 days.

(21) Appl. No.: 17/393,900

(22) Filed: Aug. 4, 2021

(65) Prior Publication Data

US 2023/0038943 A1 Feb. 9, 2023

(51) Int. Cl.
*H04W 36/00* (2009.01)
*H04W 48/16* (2009.01)
*H04W 48/20* (2009.01)
*H04W 36/30* (2009.01)

(52) U.S. Cl.
CPC . *H04W 36/00835* (2018.08); *H04W 36/0094* (2013.01); *H04W 36/30* (2013.01); *H04W 48/16* (2013.01); *H04W 48/20* (2013.01)

(58) Field of Classification Search
CPC ....... H04W 36/00835; H04W 36/0094; H04W 36/30; H04W 48/16; H04W 48/20
See application file for complete search history.

(56) References Cited

U.S. PATENT DOCUMENTS

| | | | | |
|---|---|---|---|---|
| 8,670,763 | B1* | 3/2014 | Oroskar | H04W 36/0061 455/437 |
| 9,237,502 | B1* | 1/2016 | Pawar | H04W 36/22 |
| 2006/0270407 | A1* | 11/2006 | Hidaka | H04W 36/24 455/424 |
| 2014/0329528 | A1* | 11/2014 | Zhao | H04W 24/08 455/436 |
| 2015/0181633 | A1* | 6/2015 | Kim | H04W 76/14 370/329 |
| 2017/0238243 | A1* | 8/2017 | Park | H04W 72/23 455/434 |
| 2018/0124661 | A1* | 5/2018 | Tsai | H04W 36/00835 |
| 2019/0260539 | A1* | 8/2019 | Müller | H04L 5/0023 |
| 2021/0120481 | A1* | 4/2021 | Cheng | H04W 48/10 |
| 2023/0156583 | A1* | 5/2023 | Murray | H04W 48/20 370/329 |

* cited by examiner

*Primary Examiner* — Allahyar Kasraian

(57) ABSTRACT

Disclosed are systems and methods for providing a differentiated neighbor list that can be individually generated for a specific service (e.g., per service) based on network service information, which can include, but is not limited to, a user equipment (UE) group identifier (ID), network slicing and/or quality of service (QoS) flow, and the like. Neighbors within the differentiated list can be characterized based on, but not limited to, service types, distance to devices, transport costs, service locations, and the like, or some combination thereof. The disclosed framework can generate and dynamically update a differentiated neighbor list for specific types of services so that optimal neighbor selection is performed for the type of service a UE is operating within to ensure that a network connection is maintained at a threshold satisfying QoS.

19 Claims, 5 Drawing Sheets

SYSTEM AND METHOD FOR GENERATING AND USING A DIFFERENTIATED NEIGHBOR LIST

BACKGROUND

A neighbor list (also referred to as a neighbor cell list (NCL)) is a listing or organized data structure that identifies a list of all or available neighbors (e.g., nodes or base stations) in a neighborhood (e.g., a physical proximity on a network) of user equipment (UE).

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF EXAMPLE EMBODIMENTS

Cellular networks use neighbor lists to select proper target sectors for a handover of UEs to ensure that a cellular connection is maintained at a threshold satisfying quality of service (QoS). As UEs traverse amongst sites served by a cellular network, a neighbor list can be used as a reference that indicates signal quality of neighboring cells that can be targeted for the handover. Similarly, neighbor lists can be used for re-selection of cells while UEs are idle.

Many forms of telecommunication technology, including cellular (or wireless) networks including fourth-generation (4G) and fifth-generation (5G) networks, rely on neighbor lists for controlling, managing and determining neighbor relations and/or neighbor planning among cells of a network. In some embodiments, a self-organizing network (SON) application can perform automatic neighbor relations (ANR) functions to direct capacity and reliability of such networks. ANR can be UE-based or network-based. Existing ANR requires different sets of optimized target sectors, which requires differentiated applications servers, networks and devices to support tiers of latency, reliability and throughputs.

The disclosed systems and methods provide a framework that provides a differentiated neighbor list that can be individually and autonomously generated for a specific service (e.g., per service) based on a service requirement or network service information, which can include, but is not limited to, a UE group identifier (ID), network slicing and/or QoS flow, and the like. Neighbors within the differentiated list can be characterized based on, but not limited to, service types, distance to devices, transport costs, service locations, latency and the like, or some combination thereof. In some embodiments, particular neighbors can be biased for particular service types and neighbor lists, as discussed below.

By way of a non-limiting example, as discussed in more detail below, a differentiated neighbor list can be generated for different types of services. For example, for massive Internet of Things (IoT), which can refer to massive machine-type of communications (mMTC) in 5G networks, sites with lower latency sensitivity and lower throughput values can be part of a massive IoT neighbor list; however, for unmanned aerial vehicles (UAVs), such sites may be eliminated from the UAV neighbor list due to the high connectivity demands of operating such UE (e.g., a drone).

Thus, according to some embodiments, as discussed herein, the disclosed framework provides mechanisms for generating and dynamically updating a differentiated neighbor list for specific types of services so that optimal neighbor selection is performed for the type of service of a UE to ensure that a network connection is maintained at a threshold satisfying QoS.

Figure 1:
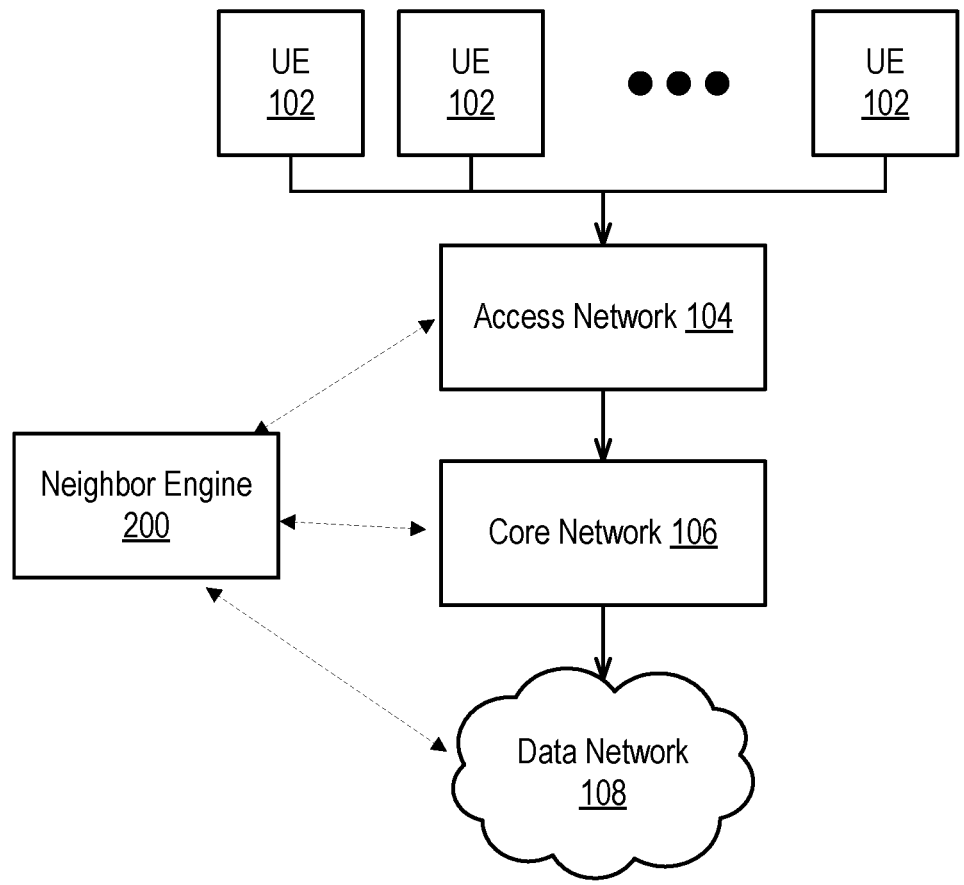
FIG. 1 is a block diagram of an example network architecture according to some embodiments of the present disclosure.

FIG. 1 is a block diagram of an example network architecture according to some embodiments of the present disclosure. In the illustrated embodiment, UE 102 accesses a data network 108 via an access network 104 and a core network 106. In the illustrated embodiment, UE 102 comprises any computing device capable of communicating with the access network 104. As examples, UE 102 may include mobile phones, smartphones, tablets, laptops, sensors, Internet of Things (IoT) devices, autonomous machines, UAVs, wired devices, wireless handsets, and any other devices equipped with a cellular or wireless or wired transceiver. One non-limiting example of a UE is provided in FIG. 5, as discussed below.

In the illustrated embodiment, the access network 104 comprises a network allowing wireless network communication with UE 102. In general, the access network 104 includes at least one base station that is communicatively coupled to the core network 106 and coupled to zero or more UEs 102.

In some embodiments, the access network 104 comprises a cellular access network, for example, a 5G network or a 4G network. In one embodiment, the access network 104 can comprise a NextGen Radio Access Network (NG-RAN), which can be communicatively coupled to UE 102. In an embodiment, the access network 104 may include a plurality of base stations (e.g., eNodeB (eNB), gNodeB (gNB)) communicatively connected to UE 102 via an air interface. In one embodiment, the air interface comprises a New Radio (NR) air interface. For example, in a 5G network, UE can be communicatively coupled to each other via an X2 interface.

In the illustrated embodiment, the access network 104 provides access to a core network 106 to the UE 102. In the illustrated embodiment, the core network may be owned and/or operated by a network operator (NO) and provides wireless connectivity to UE 102 via access network 104. In the illustrated embodiment, this connectivity may comprise voice and data services.

At a high-level, the core network 106 may include a user plane and a control plane. In one embodiment, the control plane comprises network elements and communications interfaces to allow for the management of user connections and sessions. By contrast, the user plane may comprise network elements and communications interfaces to transmit user data from UE 102 to elements of the core network 106 and to external network-attached elements in a data network 108 such as, but not limited to, the Internet, a local area network (LAN), wireless LAN, a wide area network (WAN), a mobile edge computing (MEC) network, a private network, a cellular network, and the like.

In the illustrated embodiment, the access network 104 and the core network 106 may be operated by a NO. However, in some embodiments, the networks (104, 106) may be operated by a private entity, different entities, and the like, and may be closed to public traffic. In these embodiments, the operator of the device can simulate a cellular network, and UE 102 can connect to this network similar to connecting to a national or regional network.

FIG. 1 further includes neighbor engine 200 which may be configured for performing services based UE ANR (as discussed below in relation to FIG. 3) and service based operations, administration and management (OAM) ANR (as discussed below in relation to FIG. 4). In some embodiments, neighbor engine 200 can be a special purpose machine or processor, and can be hosted by or integrated into functionality associated with access network 104, core network 106 and/or data network 108, or some combination thereof. For example, neighbor engine 200 can be configured to connect to and/or integrate with eNodeB and gNodeB components (of access network 104) that connect with 4G mobility management entity (MME)/5G Access and Mobility Management Function (AMF) components of core network 106. In some embodiments, neighbor engine 200 can store the differentiated neighbor lists in the MME/AMF, for example, hosted on a 4G or 5G Core, respectively—e.g., on network 106.

In some embodiments, neighbor engine 200 can be hosted by any type of network server, such as, but not limited to, an edge node or MEC server, application server, content server, web server, and the like, or any combination thereof.

Figure 2:
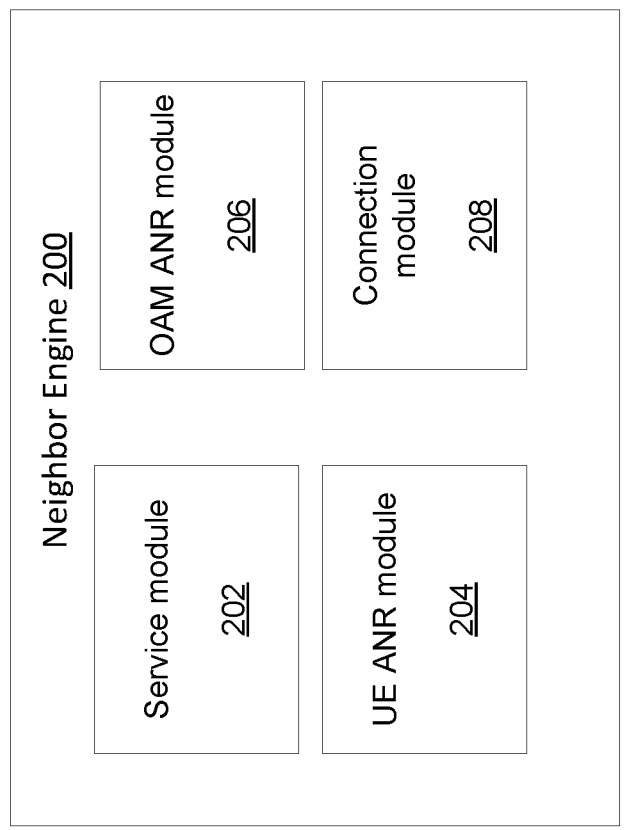
FIG. 2 is a block diagram illustrating components of an exemplary system according to some embodiments of the present disclosure.

As illustrated in FIG. 2, neighbor engine 200 can include, but is not limited to, service module 202, UE ANR module 204, OAM ANR module 206 and connection module 208. It should be understood that the neighbor engine 200 and its modules 202-208, as discussed herein, are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below in relation to FIGS. 3-4.

Figure 3:
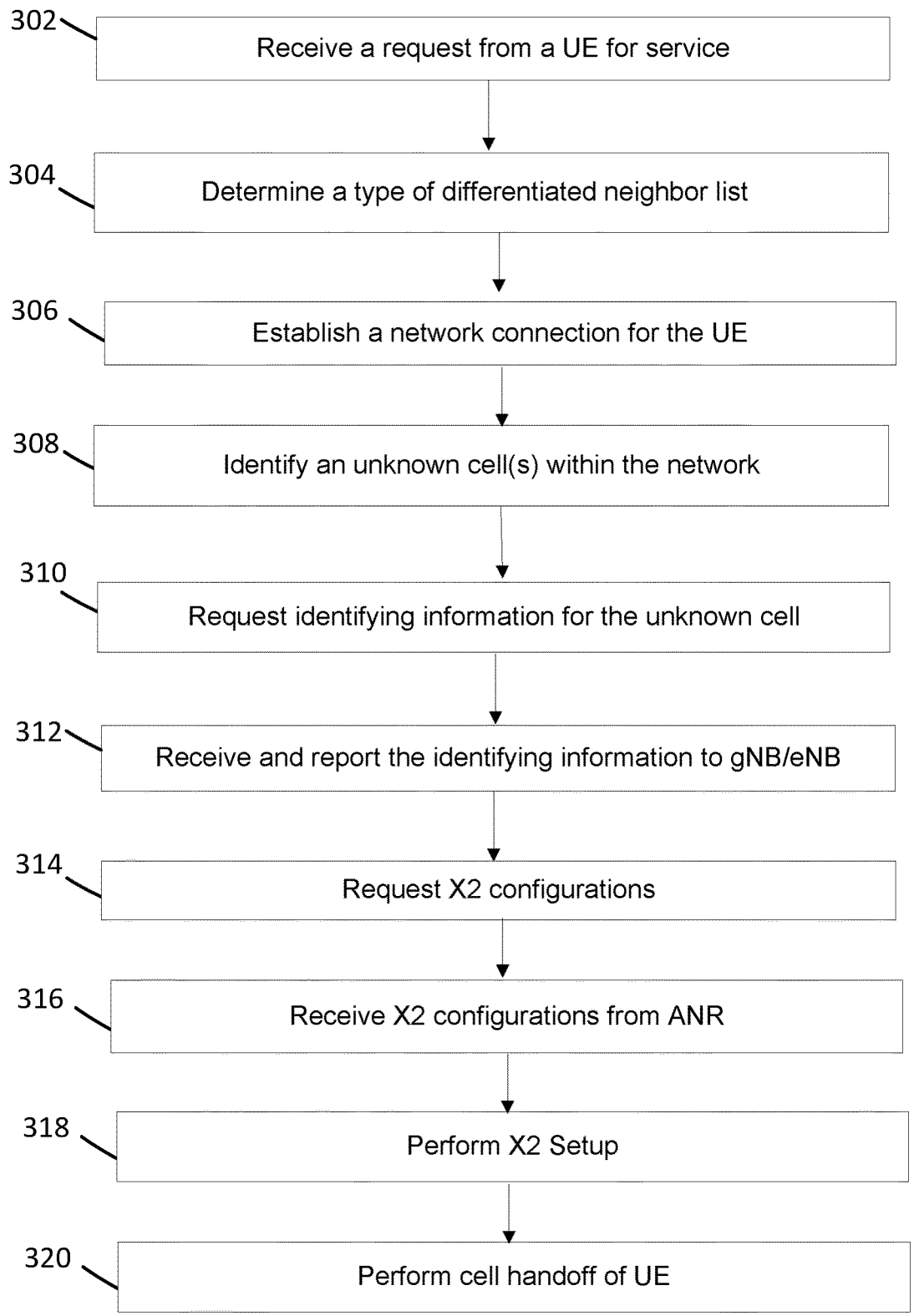
FIG. 3 illustrates an exemplary data flow according to some embodiments of the present disclosure.

FIG. 3 provides Process 300 which details non-limiting example embodiments of neighbor engine 200's implementation for performing session management for a UE in a service based UE ANR environment. According to some embodiments, as discussed herein, service based UE ANR can involve a gNB/eNB base station(s) executing policies for dictating ANR functionality for instructing UEs to perform measurements, detect cell information and report to gNB/eNB during connected mode(s). In some embodiments, Process 300 details steps for using a differentiated neighbor list(s) in real-time as a UE requests and connects to a cellular network.

According to some embodiments, Step 302 of Process 300 can be performed by service module 202 of neighbor engine 200; Steps 304 and 308-318 can be performed by UE ANR module 204; and Steps 306 and 320 can be performed by connection module 208.

Process 300 begins with Step 302 where a request from a UE for service is received. In some embodiments, the request can be detected and/or sent to a SON application operating on the network which can provide ANR functionality, which then passes the request to gNB/eNB components of the network, as discussed above.

In some embodiments, the request can be for establishing a connection to a network; and in some embodiments, the request can be for a handover to another cell and/or re-selection of another cell, as discussed above. In some embodiments, the request can include information indicating a type of service, a UE identifier (ID), a user ID, a location, applications associated with (e.g., installed and/or executing on) the UE, and the like. In some embodiments, the request can further include metrics or values indicating connectivity data related to currently detected signals being received by the UE from proximate (e.g., within a threshold distance) base stations and/or other UEs.

In Step 304, neighbor engine 200 determines a type of differentiated neighbor list. In some embodiments, the determination can be performed at and/or in association with gNB/eNB components of the network. In some embodiments, Step 304 can involve engine 200 parsing the request and identifying information related to the UE and/or its requested service that indicates a type of neighbor list that should be used for that particular UE. In some embodiments, identifying information for the UE can include, but is not limited to, a type of the UE, attributes of the UE, active and/or requested (or pending) connections related to the UE's activity, and/or any other type of information that is related to the UE's service and/or operations on the network, and the like, or some combination thereof. In some embodiments, the type of differentiated neighbor list can be based on such identifying information.

For example, if the request indicates that the UE is operating at an altitude that corresponds to UAV activity, then a UAV-type differentiated neighbor list can be identified.

In some embodiments, the differentiated neighbor list can be based on a compiled differentiated neighbor list provided by service based OAM ANR, as discussed below in relation to FIG. 4. In some embodiments, the differentiated neighbor list of Step 304 can be validated based on an OAM ANR compiled differentiated neighbor list, as discussed below in relation to FIG. 4.

In some embodiments, the differentiated neighbor list of Step 304 can be compiled in real-time (or near-real time) based on the neighbor cells detected by the UE (from Step 302, as discussed above).

In Step 306, a connection is established for the UE. In some embodiments, establishment of the connection can involve gNB/eNB components identifying a neighbor cell from the identified differentiated neighbor list that has the requisite attributes for a type of service, and facilitating a connection with that cell. In some embodiments, as discussed below, the connection can be established using network interface configuration protocols of the neighboring cell (e.g., X2 configurations).

By way of a non-limiting example, assume Table 1 below illustrates an example differentiated neighbor list for UAV-type service. Table 1 includes columns that identify the sites (and associated base stations) that a UE can connect to, and the transport latency and elevation for each site. The type of information included in Table 1 is non-limiting for a UAV-type differentiated neighbor list (and any other type of differentiated neighbor list), as a differentiated neighbor list can include different, more or less information as discussed above, such as, but not limited to, fixed wireless access (FWA), critical IoT, received power, signal strength, and the like, and/or any other type of measurements that indicate availability of a cell and/or its applicability to a type of service; and, Table 1 is provided for example illustration purposes.

TABLE 1

| UAV Neighbor list | Transport Latency (ms) | Elevation (meters) |
|---|---|---|
| Site 1 | 20 | 10 |
| Site 2 | 20 | 15 |
| Site 3 | 50 | 100 |
| Site 4 | 30 | 100 |

In some embodiments, a differentiated neighbor list can be modified to be color coded, for example, where individual boxes of the table can be shaded red and/or green to indicate whether a particular site represents a viable base station to connect to (e.g., whether a site has at least a portion of requisite attributes for a type of service). Such shading, as discussed below, can be indicated by annotations, tags and/or other forms of metadata that neighbor engine 200 can identify upon analyzing a differentiated neighbor list, and its referenced rows and columns. For example, for a UAV UE, sites 1 and 2 may have the requisite transport latency (e.g., at or below 30 ms), but their elevation is below a minimum elevation threshold (e.g., 80 meters), which is required for a high-altitude operating UAV UE (e.g., a drone). And, site 3's transport latency is too high to be used for operation of a UAV. In some embodiments, therefore, the elevation boxes of table 1 for sites 1 and 2, and the transport latency box for site 3 may be shaded "red"

From the above example table (for Step 306), site 4 can be selected because it has the requisite transport latency and elevation, according to this non-limiting example. In some embodiments, the transport latency and/or elevation boxes can be shaded "green," which as discussed below, can indicate that these boxes correspond to a site that is prime for a connection. In some embodiments, the differentiated neighbor list can include (and/or be modified to include) a column that indicates a connection is made to a particular site.

In some embodiments, the color coding of the differentiated neighbor list can increase efficiency of engine 200's analysis of the differentiated neighbor list. That is, in some embodiments, rather than having to operate algorithms (e.g., data mining, for example) to analyze the data included in the table, engine 200 can execute a "light-weight" classifier to detect colors (e.g., avoid sites with "red" colored boxes and bias towards those sites with "green" colored boxes). In some embodiments, the shading can be indicated by any type of known or to be known item, object and/or data/metadata that annotates a box within a differentiated neighbor list so as to indicate whether a site and/or a site's attributes (e.g., transport latency and elevation, for example) are okay to use as a next connection point or not. In some embodiments, any other type of color shading, box-filling, flags, tags, data objects and/or annotations to data within boxes of a table can be utilized without departing from the scope of the instant disclosure. Thus, in some embodiments, a differentiated neighbor list can be analyzed for types of annotating or descriptive information about data in a box (e.g., a color indicator) to determine if a corresponding site is an adequate option for a connection.

In Step 308, an unknown cell (or cells) can be detected. While any number of unknown cells can be detected, for purposes of this disclosure, a single unknown cell will be discussed for clarity and explanation purposes; however, it should not be construed as limiting.

According to some embodiments, an unknown cell (or missed cell, or missed neighbor, used interchangeably) can refer to a cell/base station that is undefined and/or currently unknown by the UE and/or the ANR (and its currently defined differentiated neighbor list).

Therefore, in Step 308, under UE ANR, the UE can detect undefined cells, and identify them as unknown. This detection (or identification) can be part of the handover and/or re-selection process, as the UE may need to connect to another base station due to its physical movement and/or idling, as discussed above.

Thus, in Step 308, the UE can detect the unknown cell and report detected information related to the unknown cell to the gNB/eNB. In some embodiments, the detected information can include, but is not limited to, location, latency, elevation, signal strength, and/or any other type of information that can be used to identify a cell's characteristics, as discussed above.

In Step 310, identifying information related to the unknown cell is requested. In some embodiments, Step 310 can involve gNB/eNB components receiving the detected information (from the UE in Step 308), and responding to the UE with a request to for an E-UTRAN Cell Global Identifier (ECGI) of the unknown cell.

ECGIs are used to identify cells globally and are constructed from information indicating a Mobile Country Code (MCC), Mobile Network Code (MNC) and/or E-UTRAN Cell identifier (ECI). In some embodiments, the ECGI can be detected by the UE pinging and identifying the ECGI from the cell in response to the ping request.

Thus, in Step 312, the UE communicates the ping request to the unknown cell, identifies the identifying information (e.g., ECGI) and communicates the information to the gNB/eNB.

In some embodiments, the ECGI can be identified during Step 308 during the detection of the unknown cell, whereby Process 300 can proceed from Step 308 to Step 312.

In Step 314, network interface configuration data (e.g., X2 configurations) for the unknown cell are requested. In some embodiments, Step 314 involves the gNB/eNB communicating a request to the MME/AMF components of the network, which relays the request to the ANR. In some embodiments, the request includes the ECGI, which enables the ANR to identify the corresponding X2 configuration data for the unknown cell.

According to some embodiments, X2 configurations correspond to an X2 interface of a base station that enables a base station to connect to another base station. X2 configurations can include X2 Setup information which correspond to, but are not limited to, mobility parameters, mobility settings, cell activation information, and the like. For example, X2 Setup information can include X2 Application Protocol (X2AP) protocol that handles UE mobility within E-UTRAN and provides the functions including, but not limited to, mobility management, load management, reporting of general error situations, resetting an X2 interface, setting up an X2 interface, and Node B configuration updates, and the like.

In Step 316, the requested X2 configurations are received. In some embodiments, this can involve MME/AMF components retrieving them from ANR, and transmitting them to gNB/eNB components. In some embodiments, the X2 configurations can be based on X2 configuration information provided by service based OAM ANR, as discussed below in relation to FIG. 4.

In Step 318, network interface setup (e.g., X2 Setup) for the unknown cell is performed. In some embodiments, this involves the gNB/eNB components interacting directly with the unknown cell according to the received X2 configurations. In some embodiments, Step 318 can involve the updating of the differentiated neighbor list to include information related to the unknown cell (which is now a defined cell).

In Step 320, neighbor engine 200 performs a cell handover to another cell for the UE. In some embodiments, Step 320 can be determined based on detection of a condition where the UE should connect to a new/different cell (or base station). In some embodiments, the condition can include, but is not limited to, movement of the UE and/or idling of the UE, as discussed above. In some embodiments, the condition can also and/or alternatively be based on degraded connectivity characteristics of a currently connected base station (e.g., connectivity between the UE and the connected base station).

In some embodiments, the handover can be performed using X2 Setup information for detected cells/sites in the differentiated neighbor list. In some embodiments, the connection performed in Step 320 can involve using an X2 interface to handover the UE from a source base station (e.g., the connection established in Step 306) to a target node's gNB/eNB.

In some embodiments, Step 320 can involve checking a differentiated neighbor list for a set of neighbor cells for which a handoff can occur (in a similar manner as discussed above in relation to Step 306). In some embodiments, the differentiated neighbor list being checked can be a defined neighbor list (from Step 304) and/or a neighbor list provided under service based OAM ANR, as discussed below. In some embodiments, the set of neighbor cells can include the cell defined in Step 318.

Figure 4:
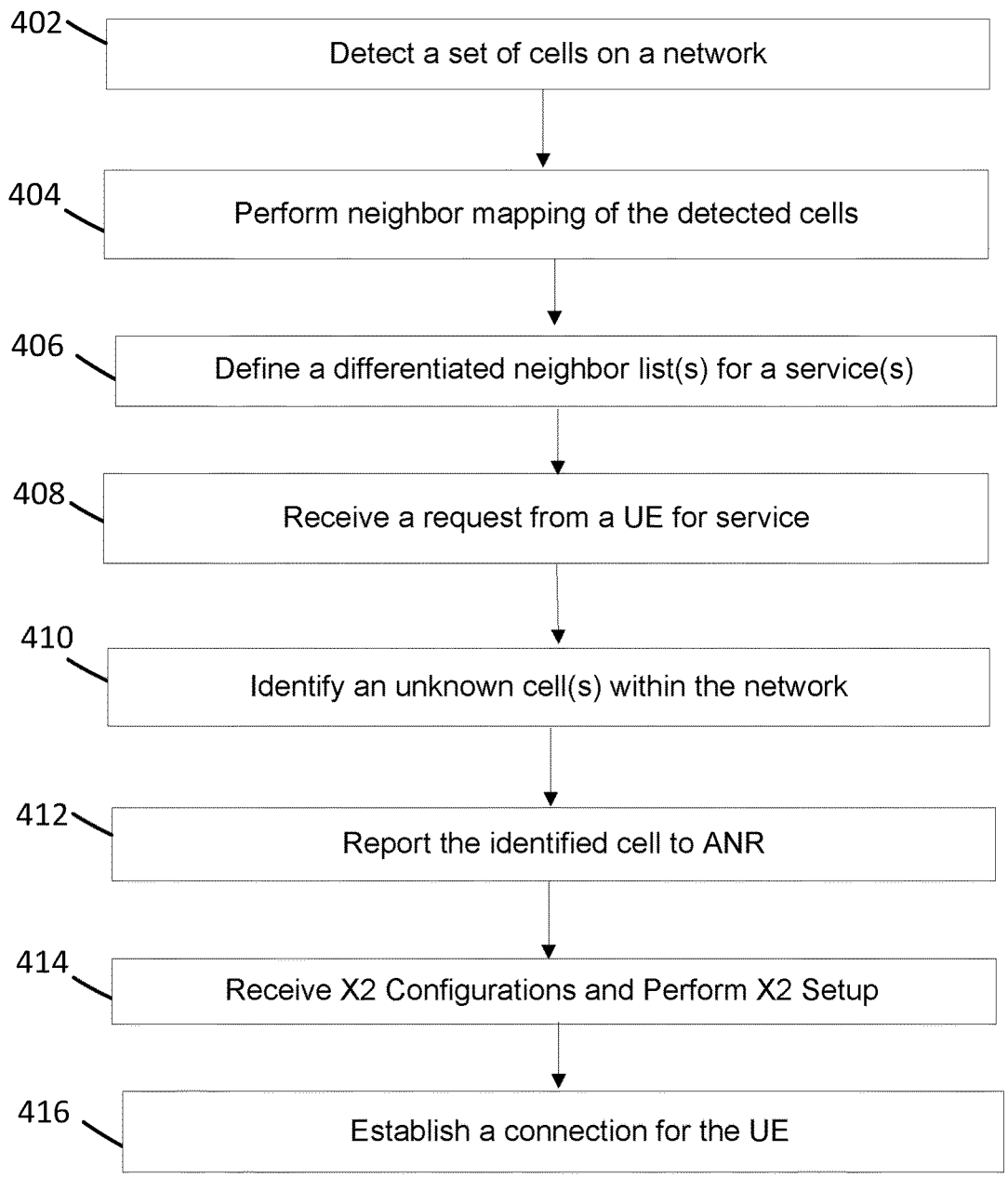
FIG. 4 illustrates an exemplary data flow according to some embodiments of the present disclosure.

FIG. 4 provides Process 400 which details non-limiting example embodiments of neighbor engine 200's implementation for performing session management for a UE via service based OAM ANR. According to some embodiments, as discussed herein, service based OAM ANR can involve a networked OAM component managing ANR generated differentiating neighbor lists, as discussed below in more detail. In some embodiments, Process 400 provides functionality for determining global neighbor lists upon which real-time neighbor lists (as discussed above in relation to FIG. 3) can be compared and updated.

According to some embodiments, Steps 402 and 408 of Process 400 can be performed by service module 202 of neighbor engine 200; Steps 404, 406 and 410-414 can be performed by OAM ANR module 206; and Step 416 can be performed by connection module 208.

Process 400 begins with Step 402 where a set of cells (or base stations) on a network are connected. As discussed above, the set of cells can be associated with a geographic region, a type of service and/or a location of a particular UE or set of UEs.

In Step 404, engine 200 performs neighbor mapping for the detected set of cells. In some embodiments, neighbor mapping can involve determining information for each cell related to, but not limited to, a type of service, an ID (e.g., ECGI), X2 data, a location (or site information), and metrics or values indicating connectivity data (e.g., strength or power of a signal), and the like, or some combination thereof. In some embodiments, an OAM component in association with the ANR of the network can communicate with gNB/eNB components on the network to determine the information for the cell neighbor mappings.

In Step 406, a differentiated neighbor list(s) is defined or (compiled) based on the neighbor mapping of Step 404. According to some embodiments, a neighbor list can be defined for each type of service provided by and/or hosted on the network. In some embodiments, individual neighbor lists can be defined according to the types of services associated with the detected and mapped cells (from Steps 404 and 406). In some embodiments, Step 406 can involve updating existing service-type neighbor lists and/or creating new service-type neighbor lists.

According to some embodiments, the differentiated neighbor list(s) defined/compiled in Step 406 can include similar attributes, settings and configurations (e.g., columns, shadings, and the like) of the differentiated neighbor lists discussed above in relation to Steps 304-306 and Table 1 of Process 300.

In Step 408, having established a differentiated neighbor list(s), as in Step 406, a request is received from a UE for service. This request operates in a similar manner as discussed above in relation to Step 302 of Process 300.

In Step 410, unknown cells are detected. Step 410 is performed in a similar manner as discussed above in relation to Step 308 of Process 300.

In Step 412, the unknown cells that were identified in Step 410 are reported to the ANR. This involves the UE detecting the unknown cells (as in Step 410), relaying identifying information related to the unknown cell to gNB/eNB components on the network, which then relay this information to the OAM operated ANR. Step 412 can be performed in a similar manner as discussed above in relation to Steps 310-314 of Process 300.

In Step 414, X2 Setup for the unknown cells is performed. Step 414 involves receiving the X2 configurations from the ANR in response to the reporting of Step 412, and performing the X2 Setup for the unknown cells in a similar manner as discussed above in relation to Steps 316-318 of Process 300. In some embodiments, the X2 configuration data can be retrieved from the differentiated neighbor list(s) defined in Step 406.

In Step 416, a network connection for the UE is established. This connection can be enabled and performed in a similar manner as discussed above in relation to Steps 306 and 320.

Figure 5:
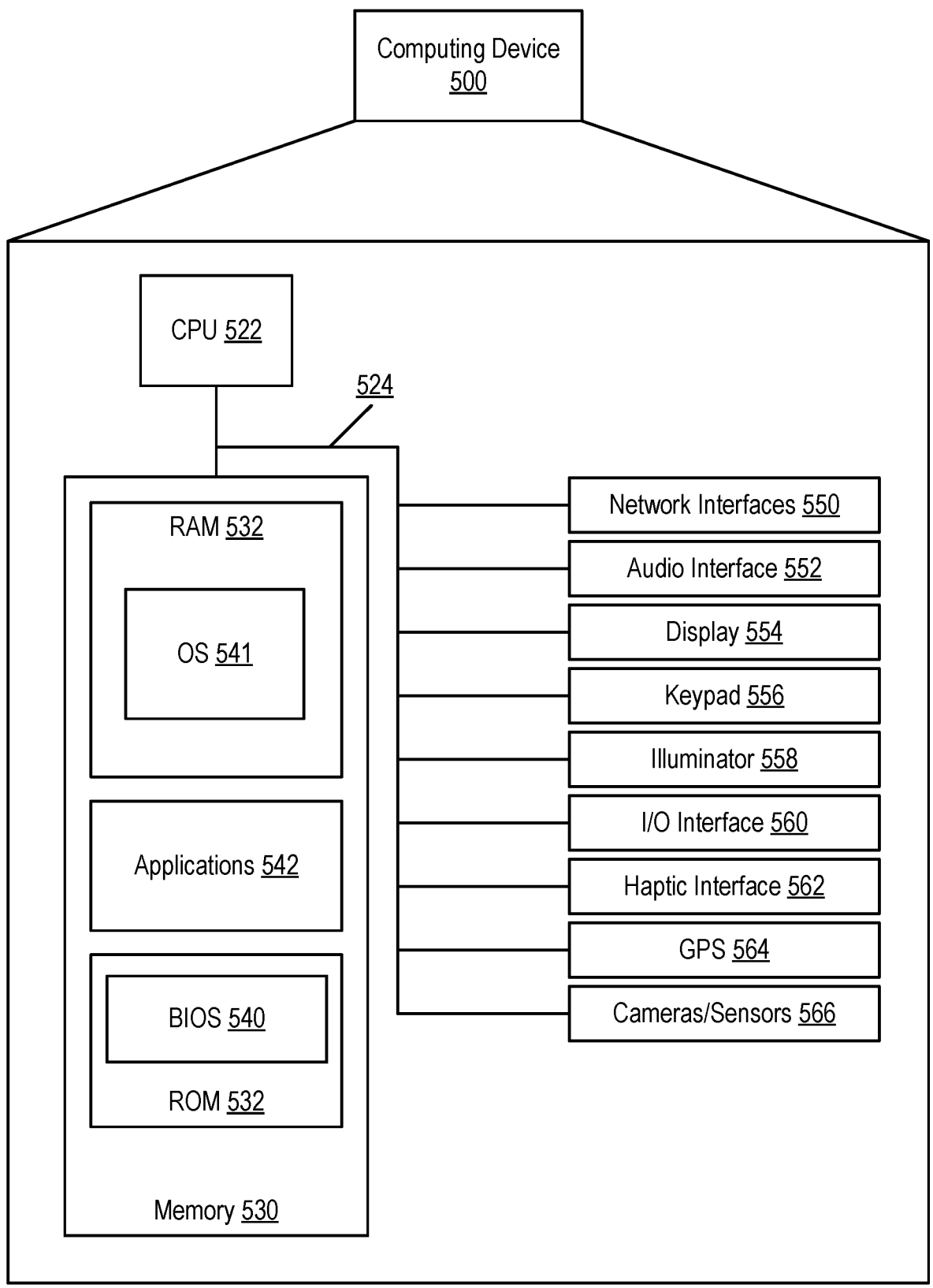
FIG. 5 is a block diagram illustrating a computing device showing an example of a client or server device used in various embodiments of the present disclosure.

FIG. 5 is a block diagram illustrating a computing device showing an example of a client or server device used in the various embodiments of the disclosure.

The computing device 500 may include more or fewer components than those shown in FIG. 5, depending on the deployment or usage of the device 500. For example, a server computing device, such as a rack-mounted server, may not include audio interfaces 552, displays 554, keypads 556, illuminators 558, haptic interfaces 562, GPS receivers 564, or cameras/sensors 566. Some devices may include additional components not shown, such as graphics processing unit (GPU) devices, cryptographic co-processors, artificial intelligence (AI) accelerators, or other peripheral devices.

As shown in FIG. 5, the device 500 includes a central processing unit (CPU) 522 in communication with a mass memory 530 via a bus 524. The computing device 500 also includes one or more network interfaces 550, an audio interface 552, a display 554, a keypad 556, an illuminator 558, an input/output interface 560, a haptic interface 562, an optional global positioning systems (GPS) receiver 564 and a camera(s) or other optical, thermal, or electromagnetic sensors 566. Device 500 can include one camera/sensor 566 or a plurality of cameras/sensors 566. The positioning of the camera(s)/sensor(s) 566 on the device 500 can change per device 500 model, per device 500 capabilities, and the like, or some combination thereof.

In some embodiments, the CPU 522 may comprise a general-purpose CPU. The CPU 522 may comprise a single-core or multiple-core CPU. The CPU 522 may comprise a system-on-a-chip (SoC) or a similar embedded system. In some embodiments, a GPU may be used in place of, or in combination with, a CPU 522. Mass memory 530 may comprise a dynamic random-access memory (DRAM) device, a static random-access memory device (SRAM), or a Flash (e.g., NAND Flash) memory device. In some embodiments, mass memory 530 may comprise a combination of such memory types. In one embodiment, the bus 524 may comprise a Peripheral Component Interconnect Express (PCIe) bus. In some embodiments, the bus 524 may comprise multiple busses instead of a single bus.

Mass memory 530 illustrates another example of computer storage media for the storage of information such as computer-readable instructions, data structures, program modules, or other data. Mass memory 530 stores a basic input/output system ("BIOS") 540 for controlling the low-level operation of the computing device 500. The mass memory also stores an operating system 541 for controlling the operation of the computing device 500.

Applications 542 may include computer-executable instructions which, when executed by the computing device 500, perform any of the methods (or portions of the methods) described previously in the description of the preceding Figures. In some embodiments, the software or programs implementing the method embodiments can be read from a hard disk drive (not illustrated) and temporarily stored in RAM 532 by CPU 522. CPU 522 may then read the software or data from RAM 532, process them, and store them to RAM 532 again.

The computing device 500 may optionally communicate with a base station (not shown) or directly with another computing device. Network interface 550 is sometimes known as a transceiver, transceiving device, or network interface card (NIC).

The audio interface 552 produces and receives audio signals such as the sound of a human voice. For example, the audio interface 552 may be coupled to a speaker and microphone (not shown) to enable telecommunication with others or generate an audio acknowledgment for some action. Display 554 may be a liquid crystal display (LCD), gas plasma, light-emitting diode (LED), or any other type of display used with a computing device. Display 554 may also include a touch-sensitive screen arranged to receive input from an object such as a stylus or a digit from a human hand.

Keypad 556 may comprise any input device arranged to receive input from a user. Illuminator 558 may provide a status indication or provide light.

The computing device 500 also comprises an input/output interface 560 for communicating with external devices, using communication technologies, such as USB, infrared, Bluetooth™, or the like. The haptic interface 562 provides tactile feedback to a user of the client device.

The optional GPS transceiver 564 can determine the physical coordinates of the computing device 500 on the surface of the Earth, which typically outputs a location as latitude and longitude values. GPS transceiver 564 can also employ other geo-positioning mechanisms, including, but not limited to, triangulation, assisted GPS (AGPS), E-OTD, CI, SAI, ETA, BSS, or the like, to further determine the physical location of the computing device 500 on the surface of the Earth. In one embodiment, however, the computing device 500 may communicate through other components, provide other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:
   receiving, by a device, a request from user equipment (UE) for a service;
   determining, by the device, based at least on the request, a differentiated neighbor list, the differentiated neighbor list corresponding to a type of service provided by the device over a network, the differentiated neighbor list comprising attribute information for a set of sites;
   analyzing, by the device, the attribute information for the set of sites, and identifying a site from the set of sites that provides a requisite attribute for the type of service of the UE;
   establishing, via the device, a network connection for the UE with a base station associated with the identified site;
   receiving, by the device, identifying information for an unknown base station on the network;
   identifying, by the device, network interface configuration data for the unknown base station based on the identifying information;
   performing, by the device, a network interface setup of the unknown base station based on the network interface configuration data;
   updating, by the device, the differentiated neighbor list for the UE to include information related to the unknown base station after performing the network interface setup, the updating causing the unknown base station to become a defined base station; and
   handing over, by the device, based on the updated differentiated neighbor list, the network connection for the UE from the base station associated with the identified site to the defined base station.

2. The method of claim 1, further comprising:
   detecting, over the network, a plurality of base stations corresponding to a physical location of the UE, each base station having associated network connectivity information;
   performing neighbor mapping for each of the plurality of base stations based on each base station's network connectivity information; and
   compiling a set of differentiated neighbor lists, each differentiated neighbor list corresponding to a type of service provided by the plurality of base stations.

3. The method of claim 2, further comprising:
   determining the differentiated neighbor list for the UE based at least on the compiled set of differentiated neighbor lists.

4. The method of claim 2, wherein the network connectivity information for a base station comprises at least one of a type of service, an ID, X2 data, a location, and metrics indicating connectivity to the network.

5. The method of claim 1, further comprising:
   identifying the network interface configuration data from at least one of the set of differentiated neighbor lists, wherein the network interface configuration data is X2 configuration data, wherein the network interface setup is a X2 Setup.

6. The method of claim 1, further comprising:
   determining a set of requisite attributes required for the type of service; and
   modifying the differentiated neighbor list to indicate sites that have at least a portion of the requisite attributes.

7. The method of claim 1, wherein the UE request comprises information indicating at least one of the type of service, a UE identifier (ID), a user ID, a location, an application executing on the UE and connectivity metrics on the network.

8. The method of claim 7, further comprising:
   analyzing the UE request; and
   determining the type of service based on the request information, wherein the type of differentiated neighbor list is based on the determination of the type of service.

9. The method of claim 1, wherein the identifying information for the unknown base station comprises an E-UTRAN Cell Global Identifier (ECGI).

10. The method of claim 1, further comprising:
    detecting a condition between the UE and the base station of the identified site; and
    selecting a different site from the set of sites included in the differentiated neighbor list.

11. The method of claim 10, wherein the condition corresponds to at least one of movement of the UE, idling of the UE and connectivity characteristics of the network connection with the base station.

12. A device comprising:
a processor configured to:
receive a request from user equipment (UE) for a service;
determine, based at least on the request, a differentiated neighbor list, the differentiated neighbor list corresponding to a type of service provided by the device over a network, the differentiated neighbor list comprising attribute information for a set of sites;
analyze the attribute information for the set of sites, and identify a site from the set of sites that provides a requisite attribute for the type of service of the UE;
establish a network connection for the UE with a base station associated with the identified site;
receive identifying information for an unknown base station on the network;
identify network interface configuration data for the unknown base station based on the identifying information;
perform a network interface setup of the unknown base station based on the network interface configuration data;
update the differentiated neighbor list for the UE to include information related to the unknown base station after performing the network interface setup, the updating causing the unknown base station to become a defined base station; and
handover, based on the updated differentiated neighbor list, the network connection for the UE from the base station associated with the identified site to the defined base station.

13. The device of claim 12, wherein the processor is further configured to:
detect, over the network, a plurality of base stations corresponding to a physical location of the UE, each base station having associated network connectivity information;
perform neighbor mapping for each of the plurality of base stations based on each base station's network connectivity information;
compile a set of differentiated neighbor lists, each differentiated neighbor list corresponding to a type of service provided by the plurality of base stations; and
determine the differentiated neighbor list for the UE based at least on the compiled set of differentiated neighbor lists.

14. The device of claim 12, wherein the processor is further configured to:
determine a set of requisite attributes required for the type of service; and
modify the differentiated neighbor list to indicate sites that have at least a portion of the requisite attributes.

15. The device of claim 12, wherein the processor is further configured to:
detect a condition between the UE and the base station of the identified site, the condition corresponds to at least one of movement of the UE, idling of the UE and connectivity characteristics of the network connection with the base station; and
select a different site from the set of sites included in the differentiated neighbor list.

16. A non-transitory computer-readable medium tangibly encoded with instructions, that when executed by a processor of the device, perform a method comprising:
receiving, by the device, a request from user equipment (UE) for a service;
determining, by the device, based at least on the request, a differentiated neighbor list, the differentiated neighbor list corresponding to a type of service provided by the device over a network, the differentiated neighbor list comprising attribute information for a set of sites;
analyzing, by the device, the attribute information for the set of sites, and identifying a site from the set of sites that provides a requisite attribute for the type of service of the UE;
establishing, via the device, a network connection for the UE with a base station associated with the identified site;
receiving, by the device, identifying information for an unknown base station on the network;
identifying, by the device, network interface configuration data for the unknown base station based on the identifying information;
performing, by the device, a network interface setup of the unknown base station based on the network interface configuration data;
updating, by the device, the differentiated neighbor list for the UE to include information related to the unknown base station after performing the network interface setup, the updating causing the unknown base station to become a defined base station; and
handing over, by the device, based on the updated differentiated neighbor list, the network connection for the UE from the base station associated with the identified site to the defined base station.

17. The non-transitory computer-readable medium of claim 16, further comprising:
detecting, over the network, a plurality of base stations corresponding to a physical location of the UE, each base station having associated network connectivity information;
performing neighbor mapping for each of the plurality of base stations based on each base station's network connectivity information;
compiling a set of differentiated neighbor lists, each differentiated neighbor list corresponding to a type of service provided by the plurality of base stations; and
determining the differentiated neighbor list for the UE based at least on the compiled set of differentiated neighbor lists.

18. The non-transitory computer-readable medium of claim 16, further comprising:
determining a set of requisite attributes required for the type of service; and
modifying the differentiated neighbor list to indicate sites that have at least a portion of the requisite attributes.

19. The non-transitory computer-readable medium of claim 16, further comprising:
detecting a condition between the UE and the base station of the identified site, the condition corresponds to at least one of movement of the UE, idling of the UE and connectivity characteristics of the network connection with the base station; and
selecting a different site from the set of sites included in the differentiated neighbor list.

* * * * *